US012631736B2

(12) United States Patent
     Cox

(10) Patent No.: US 12,631,736 B2
(45) Date of Patent: May 19, 2026

(54) MULTI-SENSOR NAVIGATION

(71) Applicant: COMMONWEALTH SCIENTIFIC AND INDUSTRIAL RESEARCH ORGANISATION, Acton (AU)

(72) Inventor: Mark Cox, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 401 days.

(21) Appl. No.: 18/258,246

(22) PCT Filed: Oct. 21, 2022

(86) PCT No.: PCT/AU2022/051268
     § 371 (c)(1),
     (2) Date: Jun. 19, 2023

(87) PCT Pub. No.: WO2023/070147
     PCT Pub. Date: May 4, 2023

(65) Prior Publication Data
     US 2024/0045041 A1      Feb. 8, 2024

(30) Foreign Application Priority Data
     Oct. 25, 2021    (AU) ................................ 2021903403

(51) Int. Cl.
     G01S 7/497        (2006.01)
     G01S 17/86        (2020.01)
(52) U.S. Cl.
     CPC ............ G01S 7/4972 (2013.01); G01S 17/86 (2020.01)

(58) Field of Classification Search
     None
     See application file for complete search history.

(56) References Cited

U.S. PATENT DOCUMENTS

2019/0353784 A1    11/2019  Toledano et al.
2020/0021728 A1*    1/2020  Yang ........................ G01S 17/87
                    (Continued)

OTHER PUBLICATIONS

Chen Fu, et al., "Linear Inverse Problem for Depth Completion with RGB Image and Sparse LID AR Fusion", 2021 IEEE International Conference on Robotics and Automation (ICRA), IEEE, Oct. 18, 2021, pp. 14127-14133 (7 pages).
                    (Continued)

*Primary Examiner* — Anshul Sood
*Assistant Examiner* — Wenyuan Yang
(74) *Attorney, Agent, or Firm* — Nixon & Vanderhye P.C.

(57) ABSTRACT

This disclosure relates to a method executed by a processor for navigating a moving vehicle through an environment. The processor captures the environment with a first sensor mounted on the moving vehicle to create first sensor data with a second sensor mounted on the moving vehicle to create second sensor data. The processor then determines a first trajectory of the first sensor and a second trajectory of the second sensor. The processor then estimates the spatial relationship between the first sensor and the second sensor based on the first trajectory and the second trajectory and uses the estimated spatial relationship to combine the first sensor data and the second sensor data into a combined multi-sensor representation of the environment. Finally, the processor navigates the moving vehicle based on the combined multi-sensor representation of the environment.

17 Claims, 3 Drawing Sheets

(56) References Cited

U.S. PATENT DOCUMENTS

2020/0145569 A1 *    5/2020    Wheeler ............. H04N 23/689
2021/0042997 A1      2/2021    Vechersky et al.

OTHER PUBLICATIONS

Lei He, et al., "De-Skewing Lill AR Scan for Refinement of Local Mapping", Sensors, vol. 20, No. 7, 1846, published Mar. 26, 2020, 20 pages.

Tilman Kuhner, et al., "Extrinsic Multi Sensor Calibration under Uncertainties", 2019 IEEE Intelligent Transportation Systems Conference (ITSC), IEEE, Nov. 28, 2019, pp. 3921-3927 (7 pages).

Miguel Ángel Muñoz-Bañón, et al., "Targetless Camera-LiDAR Calibration in Unstructured Environments", IEEE Access, vol. 8, Aug. 4, 2020, pp. 143692-143705 (14 pages).

International Search Report for PCT/AU2022/051268 dated Nov. 30, 2022, 9 pages.

Written Opinion of the ISA for PCT/AU2022/051268 dated Nov. 30, 2022, 8 pages.

* cited by examiner

300

| 301 | capturing the environment with a first sensor |
| 302 | capturing the environment with a second sensor |
| 303 | determining a first trajectory of the first sensor |
| 304 | determining a second trajectory of the second sensor |
| 305 | estimating the spatial relationship between the first sensor and the second sensor |
| 306 | using the estimated spatial relationship to combine the first sensor data and the second sensor data |
| 307 | navigating the moving vehicle |

Fig. 3

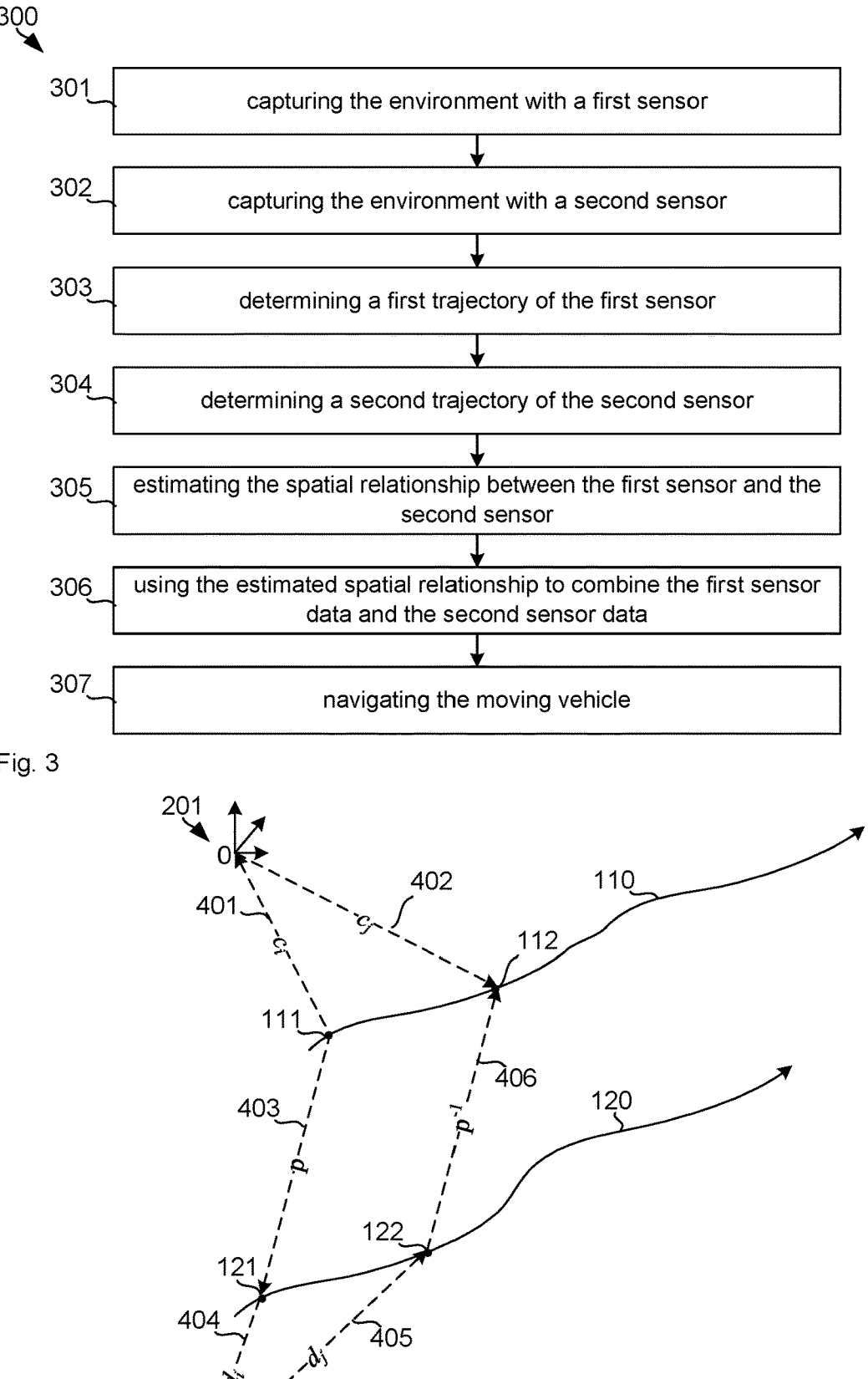

601  determine a first trajectory of the first sensor 602  determine a second trajectory of the second sensor 603  calculate the spatial relationship between the first sensor and the second sensor

MULTI-SENSOR NAVIGATION

CROSS-REFERENCE TO RELATED APPLICATIONS

This application is the U.S. national phase of International Application No. PCT/AU2022/051268 filed Oct. 21, 2022 which designated the U.S. and claims priority to Australian Provisional Patent Application No. 2021903403 filed Oct. 25, 2021, the entire contents of each of which are hereby incorporated by reference.

TECHNICAL FIELD

This disclosure relates to navigation using multiple sensors, such as, but not limited to, the use of camera and LiDAR sensors for navigation.

BACKGROUND

Cameras and light detection and ranging (LiDAR) sensors (or short "LiDARs") can be mounted on a moving vehicle to provide complementary information about the environment of the vehicle. While a camera captures an essentially 2D pixel representation of the environment in the form of a colour image, a LiDAR captures a 3D point cloud, which comprises distance information for each sampling point at respective zenith and azimuth angles. So essentially, a LiDAR provides a 3D representation of the surrounds in a polar coordinate system, which can be converted to a Cartesian coordinate system. However, LiDARs typically do not provide colour information but only the location of sampling points.

For effective navigation of the vehicle, it is desirable to obtain the location and orientation of the vehicle relative to its environment from the data generated by the camera and the LiDAR. However, the relative spatial relationship between the camera and the LiDAR is often not known, which makes combining these two data sources difficult.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

This disclosure provides a method for estimating the spatial relationship between a first sensor, such as a camera, and a second sensor, such as a LiDAR. This spatial relationship can then be used to combine the data from both sensors. The combined data can then be used for navigation or other applications. Importantly, the spatial relationship between the two sensors is based on respective trajectories of the two sensors, which can be determined based on the respective sensor data.

A method for navigating a moving vehicle through an environment comprises:

capturing the environment with a first sensor mounted on the moving vehicle to create first sensor data;

capturing the environment with a second sensor mounted on the moving vehicle to create second sensor data;

determining a first trajectory of the first sensor over time using the first sensor data, the first trajectory comprising multiple locations relative to a first world coordinate system for the first sensor;

determining a second trajectory of the second sensor over time using the second sensor data, the second trajectory comprising multiple locations relative to a second world coordinate system for the second sensor;

estimating the spatial relationship between the first sensor and the second sensor based on the first trajectory and the second trajectory;

using the estimated spatial relationship to combine the first sensor data and the second sensor data into a combined multi-sensor representation of the environment; and navigating the moving vehicle based on the combined multi-sensor representation of the environment.

A method for estimating a spatial relationship between a first sensor and a second sensor comprises:

determining a first trajectory of the first sensor over time using sensor data indicative of a scene captured over time by the first sensor moving relative to the scene;

determining a second trajectory of the second sensor over time using sensor data indicative of a scene captured over time by the second sensor moving relative to the scene; and calculating the spatial relationship between the first sensor and the second sensor based on the first trajectory and the second trajectory.

Since the calculation is based on both trajectories, the determination implicitly incorporates the mapping of the sensors relative to their environments.

In some embodiments, estimating the spatial relationship comprises optimising an objective function that includes:

two or more of the multiple locations of the first trajectory, two or more of the multiple locations of the second trajectory, and the spatial relationship.

In some embodiments, a reference transformation transforms the first world coordinate system to the second coordinate system, and the objective function is independent from the reference transformation.

In some embodiments, the objective function is based on locations on the first trajectory and the second trajectory that correspond in time.

In some embodiments, a first location of the first trajectory temporally corresponds to a first location of the second trajectory, a second location of the first trajectory temporally corresponds to a second location of the second trajectory; the objective function represents a difference between:

a result of a transformation from the first point of the first trajectory to the second point of the first trajectory, and a result of a transformation from the first point on the second trajectory to the second point on the second trajectory subject to the spatial relationship.

In some embodiments, the objective function represents the difference multiple times for further temporally corresponding locations to improve accuracy under noise.

In some embodiments, the method further comprises synchronising the first sensor data with the second sensor data to determine temporally corresponding locations.

In some embodiments, synchronising comprises interpolation of the first trajectory.

In some embodiments, the interpolation is based on quaternion representation of the locations of the first trajectory.

In some embodiments, optimising the objective function comprises optimising a modified objective function subject to an equality constraint.

In some embodiments, the objective function is modified by replacing, in the second transformation, a subject transformed by the spatial relationship with a single variable and the equality constraint is a constraint on the single variable to be equal to the subject transformed by the spatial relationship.

In some embodiments, optimising the objective function comprises iteratively performing the steps of:

optimising a first sub-problem to update an estimate of the spatial relationship given a current value of the single variable; and optimising a second sub-problem to update an estimate of the single variable given the current estimate of the spatial relationship.

In some embodiments, the method comprises optimising the objective function using alternating direction method of multipliers (ADMM).

In some embodiments, the first trajectory and the second trajectory each comprise multiple Euclidean transformations, each of the multiple Euclidean transformations including a rotation and translation, representing one of the locations.

Software, when executed by a computer, causes the computer to perform the any of the above methods.

A system comprises:

a first sensor and a second sensor; and a processor configured to:

determine a first trajectory of the first sensor over time using sensor data indicative of a scene captured over time by the first sensor moving relative to the scene;

determine a second trajectory of the second sensor over time using sensor data indicative of a scene captured over time by the second sensor moving relative to the scene, and calculate a spatial relationship between the first sensor and the second sensor based on the first trajectory and the second trajectory.

Optional features disclosed above as optional features of the method, are also optional features of the system.

BRIEF DESCRIPTION OF DRAWINGS

An example will now be described with reference to the following drawings:

FIG. 3 illustrates a method for navigating a moving vehicle through an environment.

FIG. 4 is a visual representation of an equality between various transformations.

DESCRIPTION OF EMBODIMENTS

Figure 1:
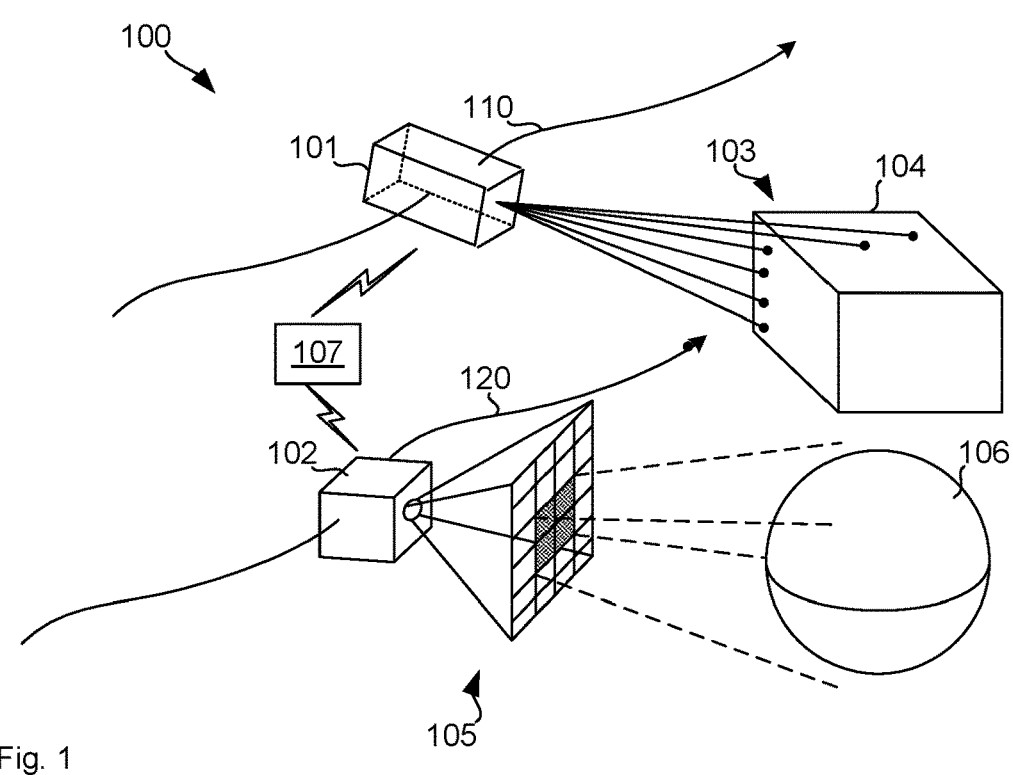
FIG. 1 illustrates a system for navigating a moving vehicle.

FIG. 1 illustrates a system 100 for navigating a moving vehicle (not shown for simplicity). System 100 comprises a LiDAR 101 and a camera 102. LiDAR 101 captures a 3D point cloud 103 of an object 104 by emitting laser beams and measuring the time of flight of reflected light sensed back at LiDAR 101. This measurement is repeated for multiple different angles of the laser beam to create the point cloud 103.

Camera 102 captures an image 105 of another object 106 by capturing illuminating light reflected from object 106. This way, camera 102 captures multiple pixel values in one image 105. These pixel values may represent red/green/blue (RGB) channels, a single intensity channel or other channels, such as hyperspectral images.

A processor 107 receives data from the LiDAR 101 and the camera 102 and performs the method disclosed herein to determine the spatial relationship between LiDAR 101 and camera 102.

As the vehicle moves, LiDAR 101 moves along a LiDAR trajectory 110 and camera 102 moves along a camera trajectory 120. The trajectories 110 and 120 are defined by respective sequences of locations.

Figure 2:
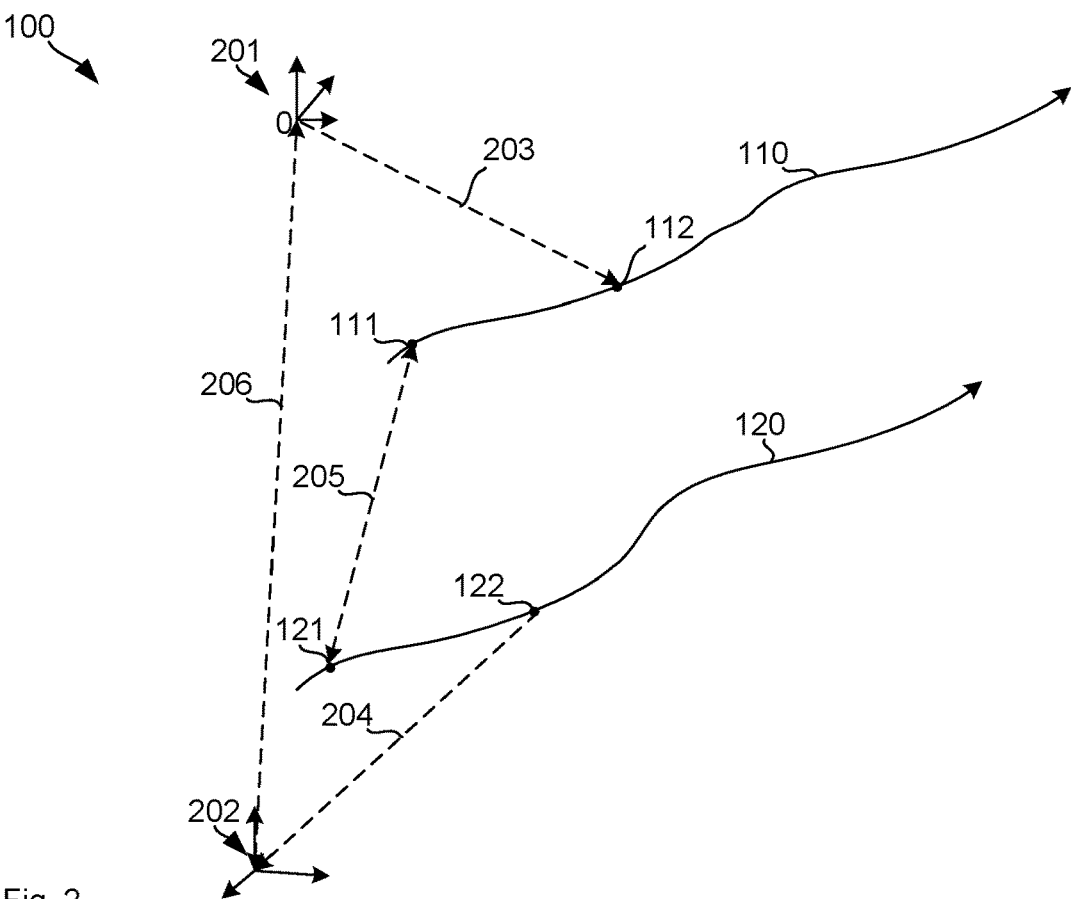
FIG. 2 is a simplified representation of FIG. 1.

FIG. 2 is a simplified representation of FIG. 1 and shows a first location 111 of LiDAR trajectory 110 and a second location 112 of LiDAR trajectory 110. Similarly, FIG. 2 shows a first location 121 of camera trajectory 120 and second location 122 of camera trajectory 120. In this context, the terms 'first' and 'second' are meant in a temporal sense such that the LiDAR 101 and camera 102 are at the first location before they come to the second location. Here, the first location 111 of the LiDAR trajectory 110 and the first location 121 of the camera trajectory have an identical time stamp. This means locations 111 and 121 have been captured simultaneously. Similarly, second locations 112 and 122 have an identical time stamp as they have been captured simultaneously. In cases where no two locations with identical time stamps can be found, one of the two trajectories can be interpolated to generate the missing locations.

Each of the locations are relative to a respective world coordinate system, also referred to as "global reference". More specifically, LiDAR locations 111 and 112 are relative to a world LiDAR coordinate system 201, while camera locations 121 and 122 are relative to a world camera coordinate system 202. It is noted that in some examples disclosed herein, the locations 111, 112, 121, 122 are referred to as Euclidean transformations or simply transformations. These transformation include a translation (move) and a rotation (orientation). For location 112, for example, the translation is indicated at 203, which essentially transforms the origin of LiDAR world coordinate system 201 onto the location 112. There may also be a rotation to reflect the orientation (direction of view) of the LiDAR at location 112. Similarly, transformation 204 transforms the camera world coordinate system 202 to location 122, potentially including a rotation to represent the orientation (direction of view) of the camera.

The world coordinate systems 201 and 202 are arbitrary and set at the beginning of performing the method. For example, the respective origins and orientation of the world coordinate systems may be set as the location and orientation when the LiDAR and camera are first turned on.

The trajectories 110 and 120 may be determined based on data generated by the LiDAR 101 and camera 102, respectively. These trajectory determinations may be performed by providing a reference objects into the environment that the respective sensor can easily recognise. The reference objects may have a known and stationary position and orientation in the environment such that processor 107 can calculate the trajectories based on point clouds and images, respectively. It is noted that both sensors (e.g., LiDAR 101 and camera 102) may capture different reference objects to calculate the respective trajectories, which has the advantage that the optimal reference can be chose for each sensor.

Since LiDAR 101 and camera 102 are mounted on a vehicle (or another moving platform) it can be assumed that the LiDAR 101 and camera 102 have a fixed spatial relationship between each other. In other words, there exists a Euclidean transformation (shown at 205 in FIG. 2 and later referred to as 'p') that maps the first location 121 of the camera onto the first location 111 of the LiDAR. As the LiDAR 101 and camera 102 move along respective trajectories 110 and 120, this transformation 205 should remain constant. It is now an aim to calculate this transformation 205. In a basic sense, it can be said that due to the fixed transformation 205, any change between locations 111 and 112 should also be the change between locations 121 and 122. However, in cases where noise is present in the sensor data, the observed change will not be equal in general. Therefore, processor 107 can optimise an objective function to minimise the difference between the two changes (which can again be represented as respective transformations).

For completeness, it is also noted that there is a transformation that maps the LiDAR world coordinate system 201 to the camera world coordinate system 202 indicated at 206 and later referred to as 'q'.

FIG. 3 illustrates a method 300, as performed by processor 107, for navigating a moving vehicle through an environment. First, the processor 107 captures 301 the environment with a first sensor, such as LiDAR 101, mounted on the moving vehicle to create first sensor data and captures 302 the environment with a second sensor, such as camera 102 mounted on the moving vehicle to create second sensor data. Then, processor 107 determines 303 the first trajectory 110 of the first sensor over time using the first sensor data. As described above, the first trajectory 110 comprises multiple locations 111/112 relative to a first world coordinate system 201 for the first sensor 101. The processor 107 further determines 304 a second trajectory 120 of the second sensor over time using the second sensor data. As also described above, the second trajectory 120 comprises multiple locations relative to a second world coordinate system 202 for the second sensor.

Based on the first trajectory 110 and the second trajectory 120, processor 107 estimates the spatial relationship 205 between the first sensor and the second sensor and then uses the estimated spatial relationship to combine the first sensor data and the second sensor data into a combined multi-sensor representation of the environment. Finally, processor 107 navigates the moving vehicle based on the combined multi-sensor representation of the environment.

The following explanation provides a more mathematical description of methods 300:

Preliminaries

The function $f(x; p)$ denotes a Euclidean transformation of the 3D point x according to the parameters p. This applies to the transform 203 in the sense that location 111 can be seen as a transform from the world coordinates system 201. This also applies to locations 112, 121, 122 and to transforms 205 and 206. The mathematical formulation of this transform is $$f(x; p) = R(p)x + t(p) \tag{1}$$

where $R(p)$ is a function which computes an orthogonal $3 \times 3$ matrix from the parameters p and $t(p)$ is a function which computes a vector of length 3 from the parameters p. The matrix $R(p)$ is said to rotate the 3D point x and $t(p)$ is said to translate (or move) the point.

The parameter vector p contains six values $p = [\theta_1, \theta_2, \theta_3, t_x, t_y, t_z]^T$ where $\theta_1$, $\theta_2$ and $\theta_3$ denote the parameters of the rotation matrix $R(p)$ and $t(p) = [t_x, t_y, t_z]^T$ is the 3D translation.

The transformation $f(x; p)$ can be generalised to an arbitrary 3D shape $X = [x_1, x_2, x_3, \ldots, x_P]$ consisting of P points via $$f(X; p) = R(p)X + t(p)1^T \tag{2}$$

where $1^T$ is a row vector of length P containing only ones. By definition, X has dimension $3 \times P$.

Trajectory Estimation

As set out above with reference to LiDAR trajectory 110 and camera trajectory 120, the term trajectory represents the motion of a sensor through 3D space. It is represented as a sequence of Euclidean transforms $\{p_1, \ldots, p_N\}$ estimated at various times $\{\tau_1, \ldots, \tau_N\}$ (including 111, 112, 121, 122). The 3D space the sensor moves through is termed the sensor's world coordinate system (201/202) and each Euclidean transform $p_i$ transforms shapes observed by the sensor at time $\tau_i$ to the sensor's world coordinate system.

For example, assume a checkerboard pattern with square dimensions 20 mm×20 mm is in a fixed position in a room. A camera observes the pattern in an image acquired at time $\tau_1$ and the 3D shape of the checkerboard relative to the camera at time $\tau_1$ is computed using an algorithm $g(\tau_1)$. The camera is then moved and the 3D shape of the checkerboard $g(\tau_2)$ is computed from a new image captured at time $\tau_2$. Since the checkerboard is in a fixed position in the world coordinate system, then the trajectory $\{p_1, p_2\}$ for the camera must satisfy $$f(g(\tau_1), p_1) = f(g(\tau_2), p_2). \tag{3}$$

There is an ambiguity in Equation 3 with respect to the definition of the sensor's world coordinate system. It can be shown that $$f(f(g(\tau_1); p_1); q) = f(f(g(\tau_2); p_2); q) \tag{4}$$

for all Euclidean transform parameters q indicating that the world coordinate system is arbitrary. Convention is that one of the Euclidean transforms in the trajectory (e.g. $p_1$) is fixed to the identity transform $p_1 = 0$. The identity transform has the property $f(X; p=0) = f(X; 0) = x$ i.e. it neither translates nor rotates the input shape X.

With $p_1 = 0$, then $p_2$ can be computed by solving $$f(g(\tau_1); 0) = g(\tau_1) = p(g(\tau_2); p_2) \tag{5}$$

$$g(\tau_1) = R(p_2)g(\tau_2) + t(p_2)1^T \tag{6}$$

In practice, Equation 6 does not hold with equality as the estimate of the 3D shape $g(\tau_i)$ is noisy. The algorithm outlined in: Olga Sorkine-Hornung and Michael Rabinovich, Least-squares rigid motion using SVD https://igl.ethz.ch/projects/ARAP/svd_rot.pdf, 2017 can be used to solve for $p_2$ if the noise is normally distributed.

It should be noted that using a calibration target such as the checkerboard pattern is one of many ways to estimate the trajectory of the sensor. Alternate methods such as odometry estimation or Simultaneous, Localisation and Mapping (SLAM) algorithms assume the environment is fixed and identify correspondences between different observations of the same structure whilst making assumptions on the trajectory or the observations e.g. the sensor moves smoothly through 3D space. One example of a SLAM algorithm is the Wildcat algorithm by Data61 of the Commonwealth Science and Industrial Research Organisation, Australia.

This disclosure provides a method that uses the estimation of a sensor's trajectory to align two trajectories under the assumption that the transformation between sensors is constant for all time, and the transform between the world coordinate system of each sensor trajectory is unknown.

Trajectory Alignment

Let $\{c_i\}$ be the trajectory of a camera 120. As before, each $c_i$ denotes a Euclidean transform, such as 121/122, that transforms shapes observed by the camera at time $\tau_i$ to their position in the camera's world coordinate system.

Let $\{d_j\}$ be the trajectory of a LiDAR 110 where each $d_j$ denotes a Euclidean transform, such as 111, 112 where observations made by the LiDAR can be transformed to positions in the LiDAR's world coordinate system.

We know from Equation 4 that the camera and LiDAR world coordinate systems are related by an unknown Euclidean transformation q 206.

It is assumed that the camera 102 is rigidly connected to the LiDAR 101. A rigid relationship means that the position and orientation of the camera 102 relative to the LiDAR 101 is constant. Mathematically, this is defined as a 3D shape $X$ observed by a LiDAR 101 is always observed at the position $f(X; p)$ by the camera 102. The parameters $p$ is also referred to as the extrinsic parameters.

To derive the trajectory alignment algorithm there is another assumption: the 3D shape $X$ observed by the LiDAR 101 is rigidly attached to the LiDAR 101 and to the camera 102 and the rank of the matrix $X$ representing the 3D shape is 3.

With these assumptions, it is now possible to state the following relationship $$f(f(X; d_i); q) = f(f(X; p); c_i) \tag{7}$$

which holds for all $i$. Here, $f(f(X; d_i); q)$ is the position of $X$ in the LiDAR trajectory's world coordinate system 201 transformed to the camera trajectory's world coordinate system 202 using the unknown transform parameters q 206. The value $f(f(X; p); c_i)$ is the position of $X$ in the camera trajectory's world coordinate system 202 using the unknown extrinsic parameters p 205.

Thus trajectory alignment requires solving for p and q given the arbitrary non planar shape $X$ and the trajectories $\{c_i\}$ and $\{d_i\}$.

Eliminating q

The transform q 205 can be eliminated by considering how the 3D shape $X$ in the local coordinate system at time $i$ changes when transformed in to the local coordinate system at time $j$. Below shows how this formulation eliminates the Euclidean transform q.

The proof requires the following notational conventions $$f(f(X; a); b) = f(X; a \circ b) \tag{8}$$

$$f^{-1}(X; a) = f(X; a^{-1}) \tag{9}$$

$$f^{-1}(f(X; a); b) = f(X; a \circ b^{-1}) \tag{10}$$

$$f^{-1}(f(X; a); a) = f(X; a \circ a^{-1}) = X \tag{11}$$

The proof begins with the noise free case (Equation 7).

$$f(f(X; d_i); q) = f(f(X; p); c_i) \tag{12}$$

$$f(X; d_i \circ q) = f(X; p \circ c_i) \tag{13}$$

-continued $$f(X; d_i \circ q \circ q^{-1} \circ d_j^{-1}) = f(X; p \circ c_i \circ c_j^{-1} \circ p^{-1}) \tag{14}$$

$$f(X; d_i \circ d_j^{-1}) = f(X; p \circ c_i \circ c_j^{-1} \circ p^{-1}) \tag{15}$$

For succinctness, we introduce $$u_k = c_i \circ c_j^{-1}$$

and $$v_k = d_i \circ d_j^{-1}$$

to denote the k th pairing of two transforms, giving $$f(X; v_k) = f(X; p \circ u_k \circ p^{-1}) \tag{16}$$

From Equation 16 we see that the parameter q has been eliminated.

FIG. 4 illustrates the equality in Equation 16 that enables the calculation of p and will later form the objective function of an optimisation problem. Equation 16 states that on the left hand side a virtual object $X$ is transformed 401 to the LiDAR's world coordinate system 201 from the LiDAR's location 111 at time $i$, and then transformed back 402 to the local LiDAR location at time $j$ 112. On the right hand side, the same object $X$ is transformed 403 from the LiDAR's point of view at time $i$ 111 to the camera's point of view at time $i$ 121 and then transformed 404 to the camera's world coordinate system 202. The virtual object $X$ is then transformed back 405 to the camera's point of view at time $j$ 122 and finally transformed back 406 to the LiDAR's point of view at time $j$ 112.

In that sense, it is now clear that calculating the spatial relationship uses an equation with two locations $c_i$, $c_j$ 111, 112 on the first trajectory 110, two locations $d_i$, $d_j$ 121, 122 on the second trajectory 120 and the spatial relationship p itself. Again, it is noted that Equation (16) is independent from the parameter q that transforms the LiDAR's world coordinate system 201 to the camera's world coordinate system 202.

Isotropic Gaussian Model

In most real-world applications, Equation 16 will not hold with equality due to noise present in the sensor trajectories $\{c_i\}$ and $\{d_j\}$. In this section it is assumed that there is an error $$e_k = f(X; v_k) - f(X; p \circ u_k \circ p^{-1}) \tag{17}$$

representing the difference between the left and right hand side of Equation 16. In other words, the objective function that is based on Equation (16) represents a difference between (a) the result of a transformation from the first point 111 to the second point 112 on the first trajectory 110 and (b) the result of a transformation from the first point 121 to the second point 122 on the second trajectory but subject to the spatial relationship p between the LiDAR 101 and the camera 102. "Subject to the spatial relationship p" means here that the object is first transformed 403 to the local camera point of view 121 and the result of the transformation is then transformed back 406 to the local LiDAR point of view as explained above.

This shows that the determination of the spatial relationship relies on four locations including two locations on each of the two trajectories. Multiple transformations are performed between these four locations and the two world coordinate systems. These transformations include essentially two groups of transformations, which both should ideally result in the same endpoint. The first group of transformations combined includes two LiDAR locations on the LiDAR trajectory and the LiDAR world coordinate system 201 while the second group of transformations includes two camera locations on the camera trajectory and the camera world coordinate system 202. The second group also includes the spatial relationship between the LiDAR and the camera. Since the points from both trajectories are included, the determination incorporates both trajectories as a basis for finding the spatial relationship between both sensors. The determination of the spatial relationship now aims to minimise this difference between the result of the two groups of transformations.

It is further assumed that $e_k$ is a random variable that can be modelled using an isotropic multivariate Gaussian distribution $$P(e_k|p) = \mathcal{N}(e_k; 0, \lambda_k^{-1}I) \tag{18}$$

where the scalar $\lambda_k > 0$ is known for all k.

The joint probability of all correspondences assuming independence between correspondences is therefore $$P(e_1 e_2 \ldots e_N \mid p) = \prod_{i=1}^{N} P(e_k \mid p) \tag{19}$$

The maximum likelihood solution of the extrinsics parameters p is therefore $$\arg\min_{p} \sum_{i=1}^{N} \frac{\lambda_i}{2} \left\| f(X; v_i) - f(X; p \circ u_i \circ p^{-1}) \right\|_F^2 \tag{20}$$

where $$\|\cdot\|_F^2$$

is the squared Frobenius Norm, which is a matrix norm of a matrix defined as the sum of the absolute squares of its elements. Equation (20) essentially means that the difference between the two groups of transformations is minimised over further temporally corresponding locations (in addition to 111/121, 112/122) to improve accuracy under noise. One potential difficulty with Equation (20) is that it may be relatively difficult to solve since enforcing orthogonality of the rotations may be difficult.

Therefore, an equivalent objective can be obtained using the knowledge that $$\|X - Y\|_F^2 = \|f(X; p) - f(Y; p)\|_F^2 \tag{21}$$

giving $$\arg\min_{p} \sum_{i=1}^{N} \frac{\lambda_i}{2} \|f(X; v_i \circ p) - f(X; p \circ u_i)\|_F^2 \tag{22}$$

Optimisation Using the ADMM

Introducing the dummy variable Y in to Equation 22, we arrive at $$\min \sum_{i=1}^{N} \frac{\lambda_i}{2} \|f(X; v_i \circ p) - f(Y; u_i)\|_F^2 \tag{23}$$

$$\text{s.t. } Y = f(X; p)$$

which can be optimised using the alternating direction method of multipliers (ADMM) as described in Stephen Boyd, Neal Parikh, Eric Chu, Borja Peleato, and Jonathan Eckstein. *Distributed optimization and statistical learning via the alternating direction method of multipliers.* Found. Trends Mach. Learn., 3(1):1-122, January 2011. Other methods include as dual decomposition, the method of multipliers, Douglas-Rachford splitting, Spingarn's method of partial inverses, Dykstra's alternating projections, Bregman iterative algorithms for l1 problems, proximal methods, and others.

ADMM takes the form of a decomposition-coordination procedure, in which the solutions to small local subproblems are coordinated to find a solution to a large global problem. ADMM can be viewed as an attempt to blend the benefits of dual decomposition and augmented Lagrangian methods for constrained optimization.

The scaled augmented Lagrangian $\mathcal{L}$ for the current problem is as follows $$L(p, Y, Z) = \frac{\lambda_i}{2} \|f(X; v_i \circ p) - f(Y; u_i)\|_F^2 + \frac{\rho}{2} \|Y - f(X; p) + Z\|_F^2 \tag{24}$$

Subproblem p

The following objective is the subproblem for the variable p $$p^* = \arg\min_{p} L(p, Y, Z) \tag{25}$$

where p denotes variable p for iteration k and p* denotes the updated variable for iteration k+1. That is, the proposed algorithm iteratively optimises the solution by repeatedly calculating an update on p and then on Y (see below).

This problem has a closed form solution as shown in Olga Sorkine-Hornung and Michael Rabinovich. Least-squares rigid motion using SVD. https://igl.ethz.ch/projects/ARAP/svd_rot.pdf, 2017.

Subproblem Y

The following is the subproblem involving the variable Y $$Y^* = \arg\min_{p} L(p, Y, Z) \tag{26}$$

$$= \arg\min_{Y} \sum_{i=1}^{N} \frac{\lambda_i}{2} \|f(X; v_i \circ p) - f(Y; u_i)\|_F^2 + \frac{\rho}{2} \|Y - f(X; p) + Z\|_F^2 \tag{27}$$

$$= \arg\min_{Y} \sum_{i=1}^{N} \frac{\lambda_i}{2} \left\| f(X; v_i \circ p \circ u_i^{-1}) - Y \right\|_F^2 + \frac{\rho}{2} \|Y - f(X; p) + Z\|_F^2 \tag{28}$$

$$= \left[ \sum_{i=1}^{N} \lambda_i + \rho \right]^{-1} \left[ \sum_{i=1}^{N} \lambda_i f(X; v_i \circ p \circ u_i^{-1}) + \rho(f(X; p) - Z) \right] \tag{29}$$

Again, Y denotes variable Y for iteration k while Y* denotes variable Y for iteration k+1. So the proposed algorithm calculates update p*, then uses that updated value to calculate update Y*, and uses that updated value to calculate update p*and so on to iteratively optimise the solution until a termination criterion is met.

After p* and Y* are computed, the scaled dual variables Z* are updated using $$Z^*=Z+Y^*-f(X;p^*). \tag{30}$$

The ADMM algorithm repeats the steps in equations (25) to (3) until convergence. The termination criterion for convergence can be formulated as a threshold on the primal residual $r^*=vec(Y^*-f(X; p^*))$ and the dual residual $$s^* = \rho \begin{bmatrix} X^T \otimes I & 1 \otimes I \end{bmatrix} \begin{bmatrix} vec(R(p^*) - R(p)) \\ t(p^*) - t(p) \end{bmatrix} \tag{31}$$

whereby $\|r^*\|_2 \le \epsilon_{pri}$ and $\|s^*\|_2 \le \epsilon_{dual}$. The value of $\epsilon_{pri}$ is typically very small to ensure the equality constraint $Y=f(X; p)$ is satisfied, leaving $\epsilon_{dual}$ to control the quality of the solution p*, with example values for both $\epsilon$ of $10^{-3}$ or $=10^{-4}$.

The operator $A \otimes B$ computes the Kronecker product of the matrices A and B.

Choosing $\lambda_i$

There are a number of strategies for choosing the values of $\lambda_i$. One basic strategy is $\lambda_1 = \ldots = \lambda_N = 1$. This unfortunately treats each correspondence equally which can lead to undesirable outcomes when a small number of correspondences are erroneous.

To handle outliers, an iterative strategy can be employed whereby the current estimate of the extrinsic parameters p is used to calculate the new values of $\lambda_i$. One such strategy is to use the function $$\lambda_i = \mathcal{N} \ (e_i;0,\sigma^{-2}I) = \mathcal{N} \ (f(X;v_i \circ p) - f(X;p \circ u_i);0,\sigma^{-2}I) \tag{32}$$

where $\sigma$ is a constant.

An extension to the above strategy is to shrink $\sigma$ after each iteration $$\sigma \leftarrow c\sigma \tag{33}$$

where $0<c<1$. A typical value for c is in the range $0.95<c<1$. Guaranteed convergence of the extrinsic parameters p is achieved by enforcing a lower bound on $\sigma$.

Synchronisation

An implicit assumption introduced above is that the time $\eta_i$ at which the LiDAR transform $d_i$ was estimated is equal to the time $\tau_i$ at which the camera transform $c_i$ was estimated. This is referred herein as a temporal correspondence. Unfortunately, this means the LiDAR and camera share the same clock which may be difficult to achieve.

From this point forward we represent trajectories by the set $\{(c_i, \tau_i)\}$ where $c_i$ is the i th transform and $\tau_i$ is the timestamp at which the i th transform was estimated. In order to successfully perform trajectory alignment processor 107 uses a pair of trajectories which are synchronised i.e. $\{(c_i, \eta_i)\}$ and $\{(d_i, \eta_i)\}$ form temporally corresponding points because the same $\eta_i$ is used as a timestamp in both transforms.

If it is assumed that the relationship between a LiDAR timestamp $\eta$ and a camera timestamp $\tau$ is known (i.e. $\tau=g(g)$ for some function g) then processor 107 samples the acquired camera trajectory $\{(c_i, \tau_i)\}$ at the timestamps $\{g(\eta_i)\}$ in order to create the synchronised camera trajectory $\{(\hat{c}_i, \eta_i)\}$.

Sampling a trajectory $\{(c_i, \tau_i)\}$ at time $\tau$ is achieved by performing the following operations:

Find the transform $c_\alpha$ which has the largest timestamp $\tau_\alpha$ such that $\tau_\alpha < \tau$.

Find the transform $c_\beta$ which has the smallest timestamp $\tau_\beta$ such that $\tau < \tau_\beta$.

Let $q_\alpha$ be the quaternion representation of transform $c_\alpha$.

Let $q_\beta$ be the quaternion representation of transform $c_\beta$.

Let $$\lambda = \frac{\tau - \tau_\alpha}{\tau_\beta - \tau_\alpha}$$

Linearly interpolate between $q_\alpha$ and $q_\beta$ to obtain q $$q=q_\alpha+\lambda(q_\beta-q_\alpha) \tag{34}$$

Normalise q such that $\|q\|=1$ i.e. $q \leftarrow \|q\|^{-1}$ q.

Convert q back to the transform representation used in the trajectory.

Temporal Relationship with Unknown Parameters

In practice, the function g which relates a timestamp of the LiDAR to a camera timestamp has unknown parameters $\Delta\eta$. For example $$\tau=g(\eta;\Delta\eta)=\eta+\Delta\eta \tag{35}$$

This would involve an algorithm for estimating $\Delta\eta$ simultaneously with the extrinsics parameters p. It is typical for bounds on possible values of $\Delta\eta$ to exist and the tolerance/accuracy of the possible values to be known. This allows a discrete number of possible values for $\Delta\eta$ to be created and a brute force search can then be performed.

The brute force search involves applying the steps below to each candidate value of $\Delta\eta$ Create the synchronised camera trajectory $\{(\hat{c}_i, \eta_i+\Delta\eta)\}$ from the acquired camera trajectory $\{(c_i, \tau_i)\}$ using the algorithm described in the previous section.

Estimate the extrinsic parameters p as per Section 3.

Compute the joint likelihood (Equation 19) for the optimised extrinsic parameters.

Once completed, the optimal value of $\Delta\eta$ is the value which produced the maximum joint likelihood.

Computer System

Figure 5:
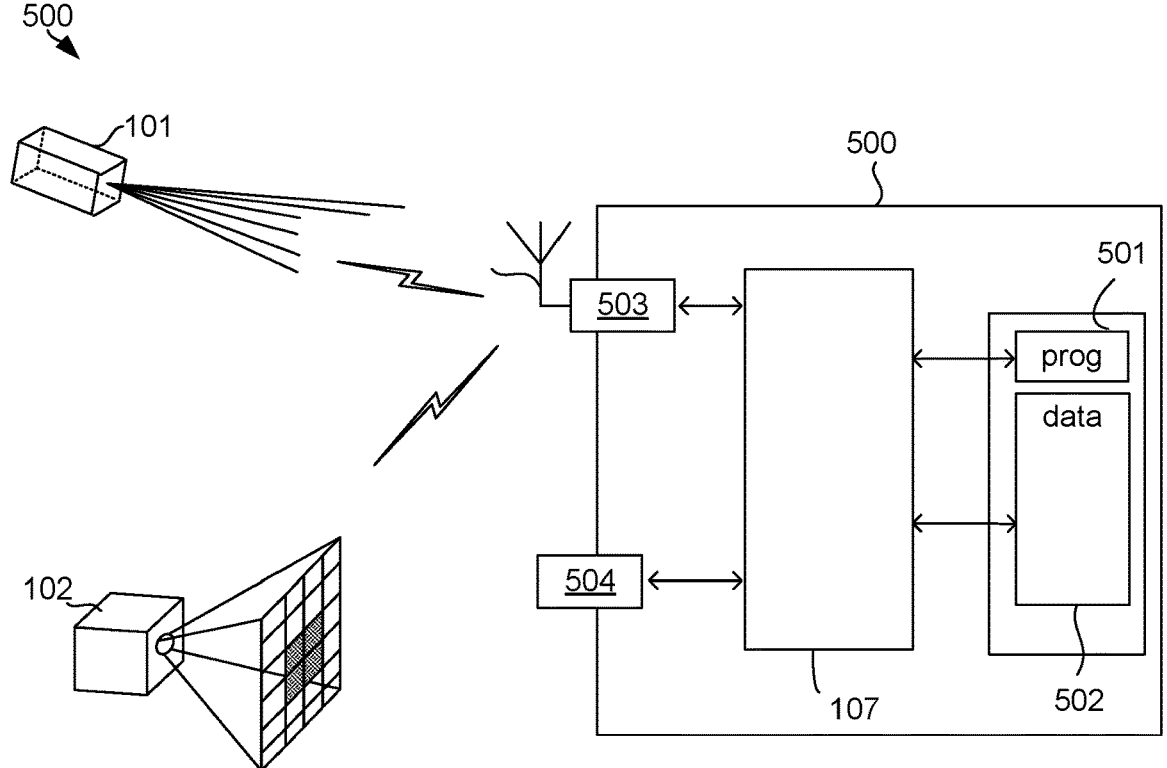
FIG. 5 illustrates a computer system for estimating a spatial relationship between a first sensor and a second sensor and then navigating a vehicle.

FIG. 5 illustrates a computer system 500 for estimating a spatial relationship between a first sensor and a second sensor and then navigating a vehicle. The computer system 500 comprises processor 107, which already featured in FIG. 1 connected to a program memory 501, a data memory 502, a communication port 503 and a control output port 504. The program memory 501 is a non-transitory computer readable medium, such as a hard drive, a solid state disk or CD-ROM. Software, that is, an executable program stored on program memory 501 causes the processor 107 to perform the method in FIG. 3 and FIG. 4, that is, calculates the spatial relationship between two sensors based on respective trajectories of those sensors. The term "calculating a spatial relationship" refers to calculating a value that is indicative of the spatial relationship. This also applies to related terms.

The processor 107 may store the sensor data, trajectories and spatial relationship on data store 502, such as on RAM or a processor register. Processor 107 may also send the determined spatial relationship via communication port 503 to a server or other computer, such as central control room.

The processor 107 may receive data, such as LiDAR and camera data, from data memory 502 as well as from the communications port 503. In one example, the processor 107 receives sensor data from LiDAR 101 and camera 102 via communications port 503, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 107 receives and processes the sensor data in real time. This means that the processor 107 calculates or updates the spatial relationship every time sensor data is received from LiDAR 101 and camera 102 and completes this calculation before the LiDAR 101 and camera 102 send the next sensor data update.

Although communications port 503 and control port 504 are shown as distinct entities, it is to be understood that any kind of data port may be used to receive data, such as a network connection, a memory interface, a pin of the chip package of processor 107, or logical ports, such as IP sockets or parameters of functions stored on program memory 104 and executed by processor 107. These parameters may be stored on data memory 502 and may be handled by-value or by-reference, that is, as a pointer, in the source code.

The processor 107 may receive data through all these interfaces, which includes memory access of volatile memory, such as cache or RAM, or non-volatile memory, such as an optical disk drive, hard disk drive, storage server or cloud storage. The computer system 500 may further be implemented within a cloud computing environment, such as a managed group of interconnected servers hosting a dynamic number of virtual machines.

It is to be understood that any receiving step may be preceded by the processor 107 determining or computing the data that is later received. For example, the processor 107 determines a point cloud and stores the point cloud in data memory 502, such as RAM or a processor register. The processor 107 then requests the data from the data memory 502, such as by providing a read signal together with a memory address. The data memory 502 provides the data as a voltage signal on a physical bit line and the processor 107 receives the point cloud via a memory interface.

Figure 6:
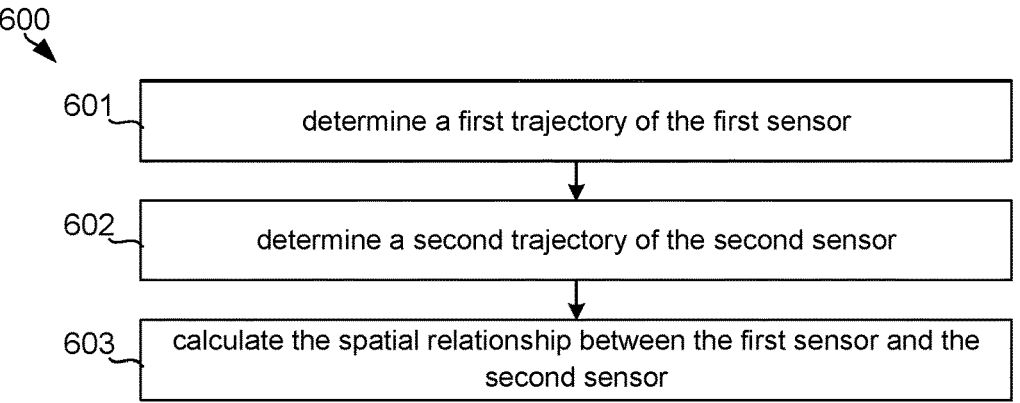
FIG. 6 illustrates a method for estimating a spatial relationship between a first sensor and a second sensor.

FIG. 3 and FIG. 6 are to be understood as a blueprint for the software program and may be implemented step-by-step, such that each step in FIGS. 3 and 6 is represented by a function in a programming language, such as C++ or Java. The resulting source code is then compiled and stored as computer executable instructions on program memory 501. Method for Determining the Spatial Relationship FIG. 6 illustrates a method 600 for estimating a spatial relationship p 403 between a first sensor and a second sensor. Typically, processor 107 performs method 600 and in that sense determines 601 a first trajectory of the first sensor, such as LiDAR 101, over time using sensor data indicative of a scene captured over time by the first sensor moving relative to the scene. Processor 107 also determines 602 a second trajectory of the second sensor, such as camera 102, over time using sensor data indicative of a scene captured over time by the second sensor moving relative to the scene. Finally, processor 107 calculates 603 the spatial relationship between the first sensor and the second sensor based on the first trajectory and the second trajectory.

Since the calculation is based on both trajectories, the determination implicitly incorporates the mapping of the sensors relative to their environments. As a result, the calculation is accurate and robust to sensor noise. It is noted that the more specific features discussed above with reference to method 300 in FIG. 3 and in particular with reference to Equations (20) and (23) and optimisation using an ADMM, also apply to method 600 in FIG. 6.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for navigating a moving vehicle through an environment, the method comprising:
  capturing the environment with a first sensor mounted on the moving vehicle to create first sensor data;
  capturing the environment with a second sensor mounted on the moving vehicle to create second sensor data;
  determining a first trajectory of the first sensor over time using the first sensor data, the first trajectory comprising multiple locations relative to a first world coordinate system for the first sensor;
  determining a second trajectory of the second sensor over time using the second sensor data, the second trajectory comprising multiple locations relative to a second world coordinate system for the second sensor;
  estimating the spatial relationship between the first sensor and the second sensor based on the first trajectory and the second trajectory, wherein estimating the spatial relationship comprises optimising an objective function that includes:
  two or more of the multiple locations of the first trajectory,
  two or more of the multiple locations of the second trajectory, and
  the spatial relationship, and
  the objective function represents the difference multiple times for further temporally corresponding locations to improve accuracy under noise;
  using the estimated spatial relationship to combine the first sensor data and the second sensor data into a combined multi-sensor representation of the environment; and
  navigating the moving vehicle based on the combined multi-sensor representation of the environment.

2. The method of claim 1, wherein a reference transformation transforms the first world coordinate system to the second coordinate system, and
  the objective function is independent from the reference transformation.

3. The method of claim 1, wherein the objective function is based on locations on the first trajectory and the second trajectory that correspond in time.

4. The method of claim 3, wherein
  a first location of the first trajectory temporally corresponds to a first location of the second trajectory,
  a second location of the first trajectory temporally corresponds to a second location of the second trajectory;
  the objective function represents a difference between:
  a result of a transformation from the first point of the first trajectory to the second point of the first trajectory, and
  a result of a transformation from the first point on the second trajectory to the second point on the second trajectory subject to the spatial relationship.

5. The method of claim 1, wherein optimising the objective function comprises optimising a modified objective function subject to an equality constraint.

6. The method of claim 5, wherein the objective function is modified by replacing, in the second transformation, a subject transformed by the spatial relationship with a single variable and the equality constraint is a constraint on the single variable to be equal to the subject transformed by the spatial relationship.

7. The method of claim 6, wherein optimising the objective function comprises iteratively performing the steps of:

optimising a first sub-problem to update an estimate of the spatial relationship given a current value of the single variable; and optimising a second sub-problem to update an estimate of the single variable given the current estimate of the spatial relationship.

8. The method of claim 1, wherein the method comprises optimising the objective function using alternating direction method of multipliers (ADMM).

9. The method of claim 1, further comprising synchronising the first sensor data with the second sensor data to determine temporally corresponding locations.

10. The method of claim 9, wherein synchronising comprises interpolation of the first trajectory.

11. The method of claim 10, wherein the interpolation is based on quaternion representation of the locations of the first trajectory.

12. The method of claim 1, wherein the first trajectory and the second trajectory each comprise multiple Euclidean transformations, each of the multiple Euclidean transformations including a rotation and translation, representing one of the locations.

13. A method for estimating a spatial relationship between a first sensor and a second sensor, the method comprising:

determining a first trajectory of the first sensor over time using sensor data indicative of a scene captured over time by the first sensor moving relative to the scene;

determining a second trajectory of the second sensor over time using sensor data indicative of a scene captured over time by the second sensor moving relative to the scene; and calculating the spatial relationship between the first sensor and the second sensor based on the first trajectory and the second trajectory, wherein calculating the spatial relationship comprises optimising an objective function that includes:

two or more of the multiple locations of the first trajectory, two or more of the multiple locations of the second trajectory, and the spatial relationship, and the objective function represents the difference multiple times for further temporally corresponding locations to improve accuracy under noise; and navigating a moving vehicle based on a combined multi-sensor representation of the scene.

14. The method of claim 13, wherein a reference transformation transforms the first world coordinate system to the second coordinate system, and the objective function is independent from the reference transformation.

15. The method of claim 13, wherein the objective function is based on locations on the first trajectory and the second trajectory that correspond in time.

16. A non-transitory, computer readable medium with software code stored thereon that, when executed by a computer, causes the computer to perform the method of claim 1.

17. A system comprising:

a first sensor and a second sensor; and a processor configured to:

determine a first trajectory of the first sensor over time using sensor data indicative of a scene captured over time by the first sensor moving relative to the scene;

determine a second trajectory of the second sensor over time using sensor data indicative of a scene captured over time by the second sensor moving relative to the scene, and calculate a spatial relationship between the first sensor and the second sensor based on the first trajectory and the second trajectory by optimising an objective function that includes:

two or more of the multiple locations of the first trajectory, two or more of the multiple locations of the second trajectory, and the spatial relationship, and the objective function represents the difference multiple times for further temporally corresponding locations to improve accuracy under noise; and navigate a moving vehicle based on a combined multi-sensor representation of the scene.

\* \* \* \* \*